US011378392B2

(12) United States Patent
Tanaka

(10) Patent No.: US 11,378,392 B2
(45) Date of Patent: Jul. 5, 2022

(54) MARKER

(71) Applicant: National Institute of Advanced Industrial Science and Technology, Tokyo (JP)

(72) Inventor: Hideyuki Tanaka, Nagareyama (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 0 days.

(21) Appl. No.: 17/267,933

(22) PCT Filed: Aug. 9, 2019

(86) PCT No.: PCT/JP2019/031712
§ 371 (c)(1),
(2) Date: Feb. 11, 2021

(87) PCT Pub. No.: WO2020/036150
PCT Pub. Date: Feb. 20, 2020

(65) Prior Publication Data
US 2021/0180944 A1    Jun. 17, 2021

(30) Foreign Application Priority Data

Aug. 15, 2018 (JP) .............................. JP2018-152963

(51) Int. Cl.
*G01B 11/26* (2006.01)
(52) U.S. Cl.
CPC .................................. *G01B 11/26* (2013.01)
(58) Field of Classification Search
CPC ......... G01B 11/26; G01B 11/002; G06T 7/90; G06T 1/00; G06T 2207/10024;
(Continued)

(56) References Cited

U.S. PATENT DOCUMENTS

| 2016/0287341 A1 | 10/2016 | Hong et al. |
| 2019/0228541 A1 | 7/2019 | Tanaka |
| 2020/0025562 A1* | 1/2020 | Saito ...................... G01B 11/26 |

FOREIGN PATENT DOCUMENTS

| CN | 101274432 A | 10/2008 |
| CN | 101777509 A | 7/2010 |

(Continued)

OTHER PUBLICATIONS

International Search Report and International Preliminary Report on Patentability, English Translation, from PCT/JP2019/031712 filed Aug. 9, 2019, dated Sep. 10, 2019 and Feb. 16, 2021.

(Continued)

*Primary Examiner* — Sunghee Y Gray
(74) *Attorney, Agent, or Firm* — Workman Nydegger

(57) ABSTRACT

In order to provide a means to uniquely estimate the attitude in a wider range of angles to thereby realize a more accurate attitude estimate, a planar marker is provided. The planar marker includes a planar visual marker having a two-dimensional pattern code and at least two attitude inversion detection patterns Fx and Fy each consisting of a transparent cylindrical body having a pattern on the side face within the range of 180 degrees around the central axis ra and being provided so as to be orthogonal to each other on the same plane as that of planar visual marker. A marker is provided that includes at least one attitude inversion detection pattern. The attitude inversion detection pattern consists of the planar visual marker and a transparent spherical body having a pattern on a hemispherical surface and is provided on the same plane as that of the planar visual marker.

8 Claims, 11 Drawing Sheets

(58) Field of Classification Search
CPC ............. G06T 2207/30204; G06T 7/73; G01J 3/0272; G01J 3/2803; G01J 3/463; G01J 3/504; G01N 2021/8427; G01N 21/57; G01N 21/8422; G01N 2201/0221
USPC ........................................................ 356/318
See application file for complete search history.

(56) References Cited

FOREIGN PATENT DOCUMENTS

| | | | |
|---|---|---|---|
| CN | 102190186 A | 9/2011 | |
| CN | 104864809 A | 8/2015 | |
| CN | 105513065 A | 4/2016 | |
| CN | 106200277 A | 12/2016 | |
| JP | H11-051651 A | 2/1999 | |
| JP | 2012-145559 A | 8/2012 | |
| WO | WO-0146644 A1 * | 6/2001 | ........... G01B 11/026 |
| WO | 2018/051843 A1 | 3/2018 | |

OTHER PUBLICATIONS

Tanaka, Hideyaki, "A Visual Marker for Precise Pose Estimation based on Lenticular Lenses", IEEE International Conference on Robotics and Automation, May 14-18, 2012, pp. 5222-5227, St. Paul, Minnesota, USA.
Extended European Search Report, dated Apr. 4, 2022, for EP Application No. 19850499.5.
Chinese Office Action, dated Mar. 2, 2022, for CN Application No. 201980053602.4.

* cited by examiner

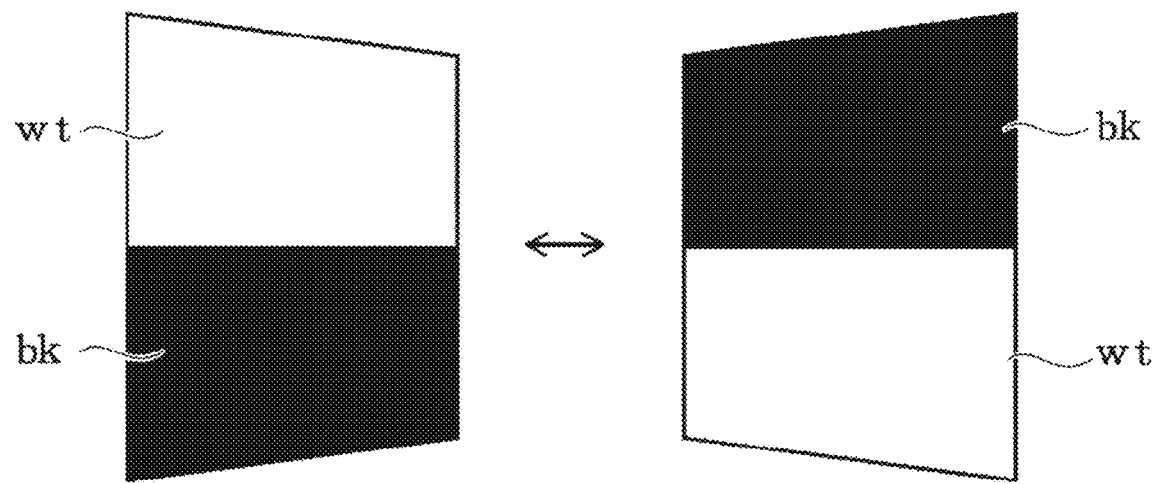
Fig. 11(a)    Fig. 11(b)
FIG.12A
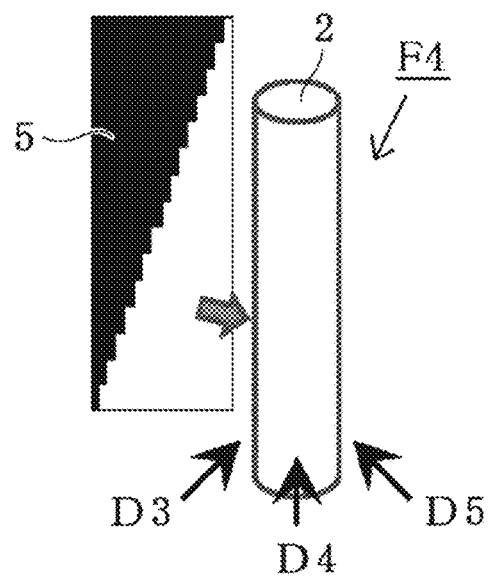

MARKER

TECHNICAL FIELD

The present invention relates to a marker to estimate an attitude.

BACKGROUND ART

Conventionally, planar patterns have been suggested that can be imaged by a monocular camera to thereby provide the measurement of a position or an attitude in a three-dimensional space. Such planar markers are generally called a planar marker.

The planar marker as described above is used by being adhered to a measuring target in the fields of Augmented Reality (AR) or robotics. The attitude is estimated based on the distortion of the appearance of the shape profile of the planar marker in accordance with the projective transformation principle.

However, depending on some conditions, the projection on an image of a planar marker M is closer to the orthographic projection shown in FIG. 16B than to the perspective projection shown in FIG. 16A. Thus, a disadvantage of an uncertain attitude is caused because the attitude of the planar marker M1 or M2 shown in FIG. 17 of the planar marker cannot be uniquely estimated to the camera.

In view of the above, the planar marker disclosed in Patent Literature 1 has been suggested in order to solve the disadvantage as described above based on a combination of a lenticular lens and a stripe pattern. This planar marker has a configuration in which RAS (Rotation Angle Scale) marker units for generating a moire (interference fringe) changing depending on an observation angle are provided along two adjacent sides of the conventional AR marker, respectively.

The planar marker having the configuration as described above is also detailed in Non-patent Literature 1.

CITATION LIST

Patent Literature

Patent Literature 1: Japanese Patent Laid-Open No. 2012-145559

Non-Patent Literature

Non-patent Literature 1: H. Tanaka, Y. Sumi, and Y. Matsumoto, "A Visual Marker for Precise Pose Estimation based on Lenticular Lenses", Proc. 2012 IEEE International Conference on Robotics and Automation (ICRA2012), pp. 5222-5227, Saint Paul, USA. 2012.

SUMMARY OF INVENTION

Problem to be Solved by the Invention

In the case of the planar marker as described above, the RAS marker unit has a cyclic and symmetrical configuration to a viewing angle (i.e., observation direction), thus causing the limitation that the attitude can be uniquely estimated only within an angle from the positions at which the markers are opposed to each other in a face-to-face manner.

The present invention has been made in order to solve the disadvantage as described above. It is an objective of the invention to provide the more accurate attitude estimate by providing a means to uniquely estimate the attitude within a wider range of angles.

Solution to Problem

In order to solve the disadvantage as described above, the present invention provides a marker that includes a two-dimensional pattern code and at least two attitude inversion detection patterns. Each of the attitude inversion detection patterns consists of a transparent cylindrical body having a pattern on a side face over a range of 180 degrees around the central axis. The attitude inversion detection patterns are provided so as to be orthogonal to each other on the same plane as that of the two-dimensional pattern code.

The attitude inversion detection pattern may also have, instead of the transparent cylindrical body, another configuration composed of a based having a semicircular cross section and a surface having a pattern thereon and a transparent cylindrical body engaged with the groove.

In order to solve the disadvantage, the present invention provides a marker including a two-dimensional pattern code and at least one attitude inversion detection pattern. The at least one attitude inversion detection pattern consists of a transparent spherical body having a hemispherical surface having thereon a pattern and is provided on the same plane as that of the two-dimensional pattern code.

The attitude inversion detection pattern may also have, instead of the transparent cylindrical body, another configuration composed of a base having a pattern on a surface thereof and having a hemispherical concave section and a transparent spherical body engaged with the concave section.

Effects of Invention

The present invention can provide the more accurate attitude estimate by providing a means to uniquely estimate the attitude within a wider range of angles.

BRIEF DESCRIPTION OF DRAWINGS

FIG. 7A illustrates the appearance when the visual line angle SA has a positive value. FIG. 7B illustrates the appearance when the visual line angle SA is zero. FIG. 7C illustrates the appearance when the visual line angle SA has a negative value.

FIGS. 11A and 11B illustrate how the attitude inversion detection pattern F3 shown in FIG. 10 is seen. FIG. 11A illustrates the appearance when the attitude inversion detection pattern F3 is seen from the direction D1 shown in FIG. 10. FIG. 11B illustrates the appearance when the attitude inversion detection pattern F3 is seen from the direction D2 shown in FIG. 10.

FIG. 12A illustrates the configuration of the attitude inversion detection pattern F4 according to the fourth illustrative example of the attitude inversion detection patterns Fx and Fy shown in FIG. 2.

DESCRIPTION OF EMBODIMENTS

Figure 1:
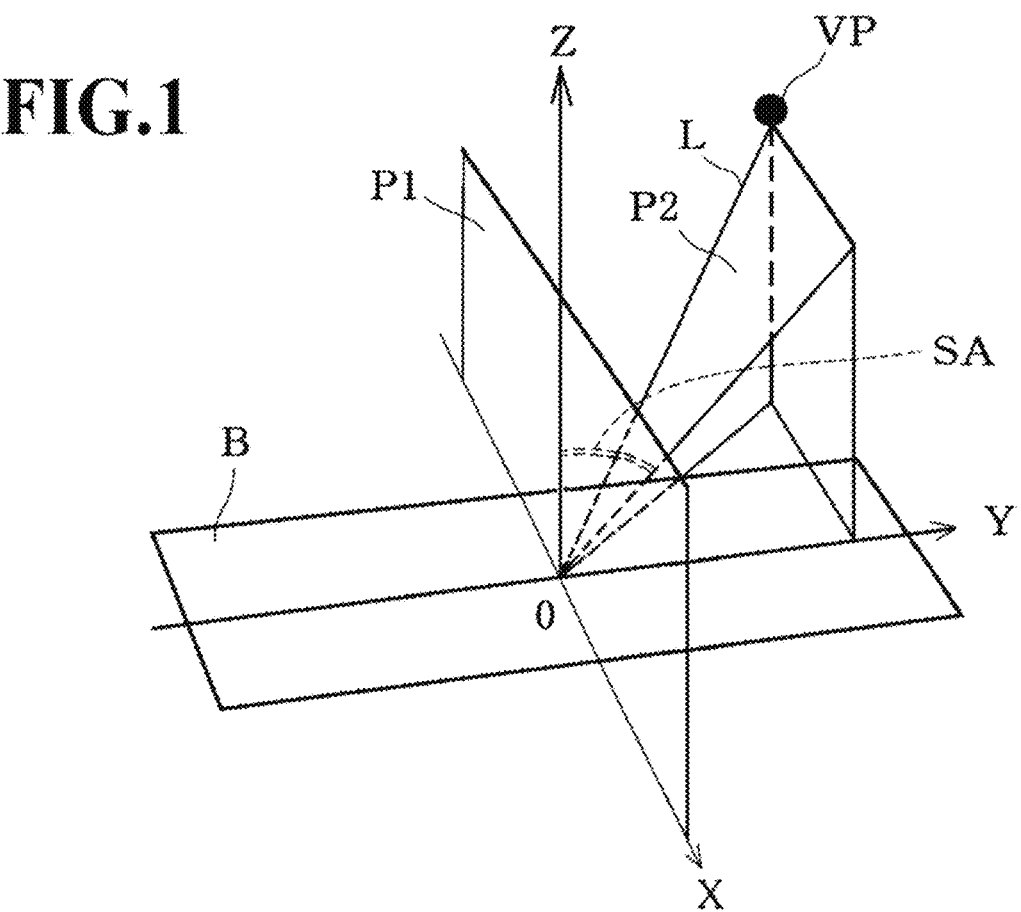
FIG. 1 is a diagram to explain the definitions of a visual line and a visual line angle.

The following section will describe an embodiment of the present invention in detail with reference to the drawings. In the drawings, the same reference numerals denote the same or similar parts.

First, with reference to FIG. 1, the following section will describe the definitions of a visual line and a visual line angle. The following section will describe an event around an X axis as an example. However, events around an arbitrary axis also may be similarly defined.

The line L connecting the observation visual point VP shown in FIG. 1 to the origin 0 as the center of the target object B is called a visual line. As shown in FIG. 1, when assuming that the plane P1 is a plane including the Z axis forming the perpendicular line on the XY plane in the target object B and the plane including the X axis orthogonal to the Z axis and that the plane P2 is a plane including the line L showing the visual line and the X axis, then the angle SA formed by the plane P1 and the plane P2 is called a visual line angle around the X axis. The following section will describe, based on this definition, the planar marker 1 according to an embodiment of the present invention in detail.

The attitude inversion including uncertainty described in the "Problem to be Solved by the Invention" section in this specification may be physically explained as the sign inversion phenomenon of the visual line angle around the X axis and the Y axis defining the plane of the planar marker. Thus, the detection of the sign inversion requires two attitude inversion detection patterns provided so as to be orthogonal to each other at least in the X axis and the Y axis, respectively.

The attitude inversion detection pattern has a structure to determine whether or not a visual line angle around one axis has a positive value or a negative value based on the appearance. This structure will be detailed later.

Figure 2:
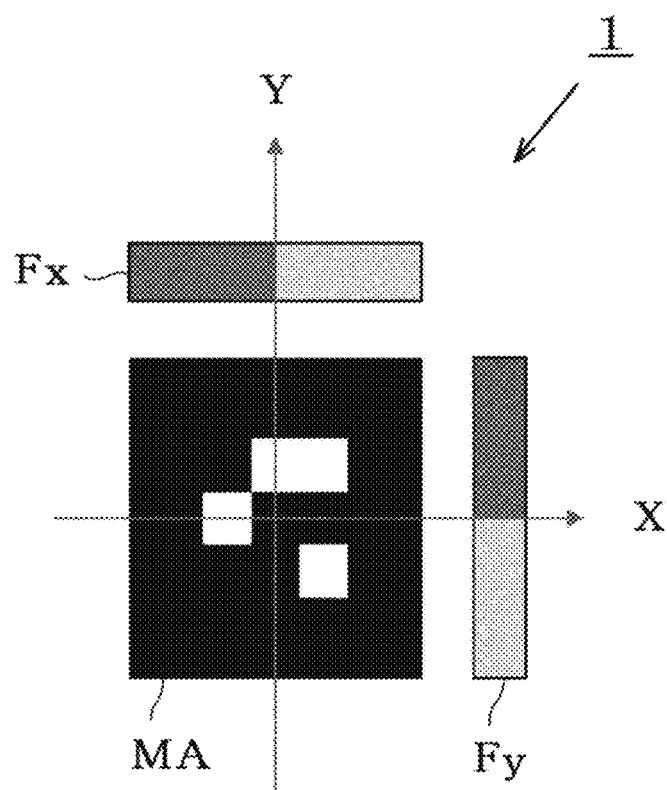
FIG. 2 illustrates the configuration of a planar marker 1 according to an embodiment of the present invention.

FIG. 2 illustrates the configuration of the planar marker 1 according to an embodiment of the present invention. As shown in FIG. 2, the planar marker 1 includes the planar visual marker MA including a two-dimensional pattern code shown based on white spaces on a black background for example and at least two attitude inversion detection patterns Fx and Fy provided so as to be orthogonal to each other on the same plane as the two-dimensional pattern code.

As described later, the attitude inversion detection pattern Fx has a function to detect the attitude inversion around the X axis while the attitude inversion detection pattern Fy has a function to detect the attitude inversion around the Y axis.

When the planar marker 1 includes the two attitude inversion detection patterns Fx and Fy for example, there may be four arrangements in which the attitude inversion detection patterns Fx and Fy are provided so as to be orthogonal to each other around the planar visual marker MA as described above.

Specifically, the attitude inversion detection pattern Fx is provided to be parallel to the first side parallel to the X axis of the planar visual marker MA. The attitude inversion detection pattern Fy is provided to be parallel to the second side that is parallel to the Y axis of the planar visual marker MA and that is adjacent to the first side. An example of such an arrangement is shown in FIG. 2.

Figure 3:
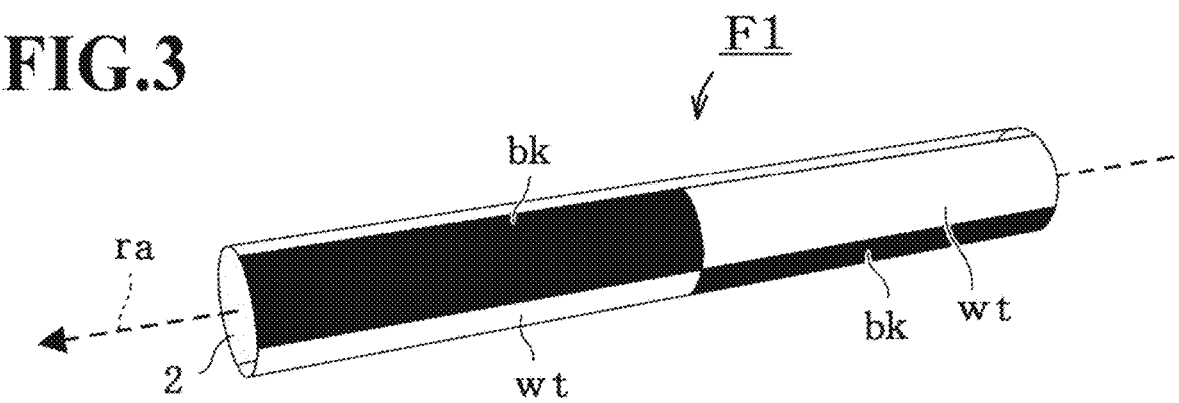
FIG. 3 illustrates the basic structure of the attitude inversion detection pattern F1 according to the first illustrative example of the attitude inversion detection patterns Fx and Fy shown in FIG. 2.

The following section will describe the structures of the attitude inversion detection patterns Fx and Fy. FIG. 3 illustrates the basic structure of the attitude inversion detection pattern F1 according to the first illustrative example of the attitude inversion detection patterns Fx and Fy shown in FIG. 2. As shown in FIG. 3, the attitude inversion detection pattern F1 consists of the transparent cylindrical body 2 in which a pattern is attached on the side face over the range of 180 degrees around the central axis ra.

A side of the side face over the range of 180 degrees around the central axis ra for which the pattern is not attached is transparent (hereinafter this side face will be called a "transparent-side side face"). The pattern is visually recognized through the transparent-side side face.

Figure 4:
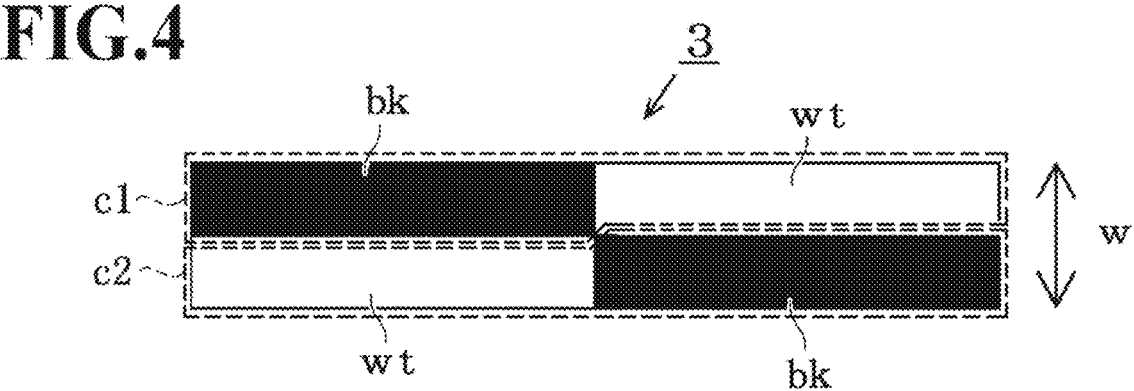
FIG. 4 illustrates the colored pattern 3 of the transparent cylindrical body 2 shown in FIG. 3.

The transparent cylindrical body 2 consists of a cylindrical member made of transparent material such as acrylic or glass. An example of the pattern is shown as the colored pattern 3 of FIG. 4. In FIG. 4, the colored pattern 3 has the width w showing the length of the semicircular arc of the circular forming the bottom face of the transparent cylindrical body 2.

As shown in FIG. 4, the colored pattern 3 includes the first colored section c1 having two color sections of at least the black section bk and the white section wt in the direction of the central axis ra within the range of 90 degrees around the central axis ra of the side face for example and the second colored section c2 having two color sections of at least the white section wt and the black section bk in the direction of the central axis ra within the range of 90 degrees around the central axis ra adjacent to the first colored section c1 so that the second colored section c2 is different from the first colored section c1.

Figure 5A:
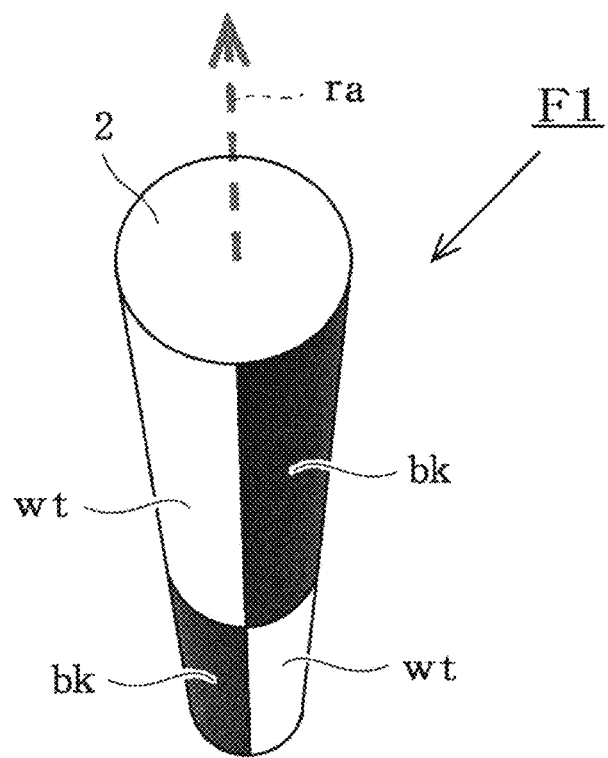
FIG. 5A is a perspective view illustrating the attitude inversion detection pattern F1 shown in FIG. 3.
Figure 5B:
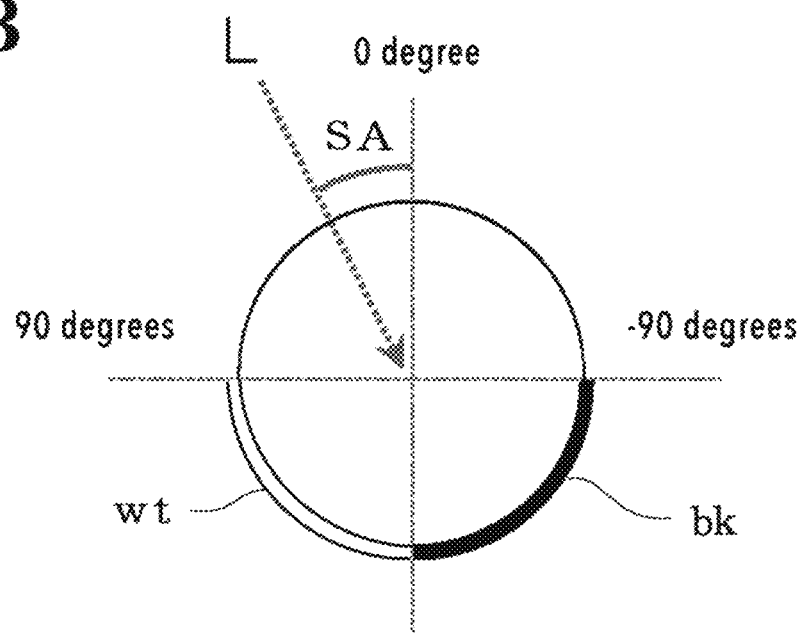
FIG. 5B is a diagram to explain the definition of the visual line angle SA of the rotation axis ra shown in FIG. 5A.

The following section will describe, with reference to FIG. 5A and FIG. 5B to FIG. 7, how the attitude inversion detection pattern F1 having the configuration as described above is seen. It is assumed that the visual line angle around the rotation axis ra of the attitude inversion detection pattern F1 shown in FIG. 5A is defined as an angle formed by the line L showing the visual line and the reference axis in the cross section obtained by cutting the transparent cylindrical body 2 in the plane having the rotation axis ra as a normal line as shown in FIG. 5B when the position of the transparent-side side face at which the boundary between the white section wt and the black section bk can be visually recognized at the front face is a reference axis (0 degree) and the rotation angle to the white section wt side is positive and the rotation angle to the black section bk side is negative.

Figure 6:
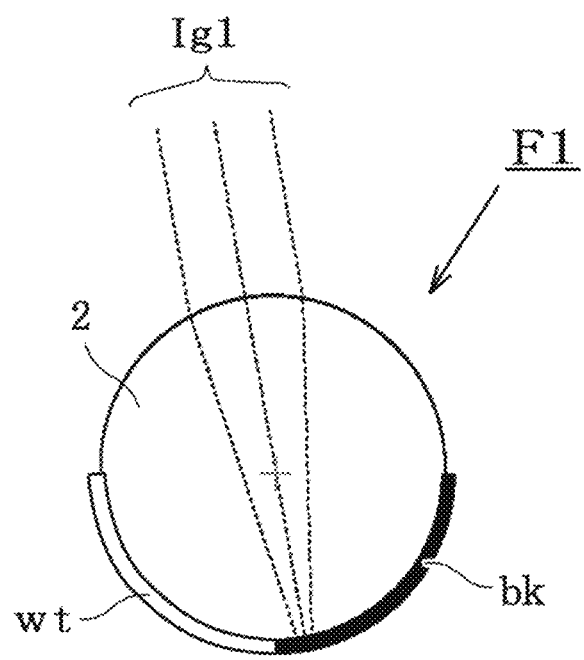
FIG. 6 illustrates an image generated by the attitude inversion detection pattern F1 shown in FIG. 3.
Figure 7:
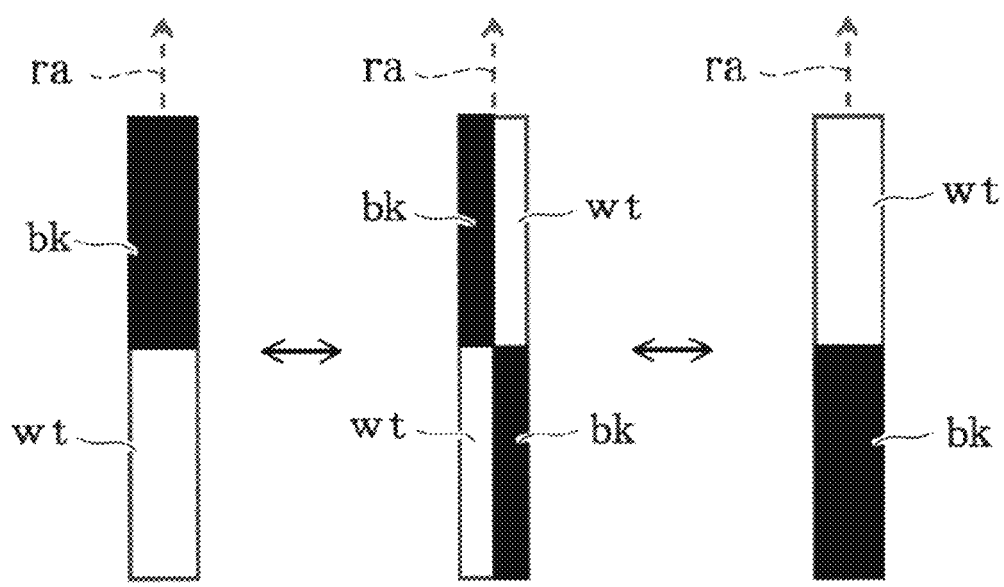
FIGS. 7A to 7C illustrate how the attitude inversion detection pattern F1 is seen depending on the visual line angle SA.

The attitude inversion detection pattern F1 has an action provided by the lens effect of the transparent cylindrical body 2 to form a magnified image of a part of the pattern attached to the side face. FIG. 6 shows an example in which the reflected light emitted from a part of the black section bk forms a black image Ig1.

Thus, the attitude inversion detection pattern F1 having the action as described above has the appearance as shown in FIGS. 7A-7C in which the positions of the white section wt and the black section bk are switched depending on the visual line angle.

Specifically, when assuming that the direction of the arrow of the rotation axis ra is represented as "upper side" and the visual line angle is positive (+) as shown in FIG. 7A, the appearance includes the upper side having the black section bk and the lower side having the white section wt. When the visual line angle is negative (−) as shown in FIG. 7C, the colors of the upper side and the lower side are switched and the appearance includes the upper side having the white section wt and the lower side having the black section bk.

As shown in FIG. 7B, when the visual line angle is zero, the appearance is configured so that, when assuming that the boundary between the first colored section c1 and the second colored section c2 shown in FIG. 4 is a center line, the upper side has the black section bk and the white section wt adjacent to each other from the left side in the drawing while the lower side has the white section wt and the black section bk adjacent to each other from the left side in the drawing.

The attitude inversion detection pattern F1 as described above allows the transparent cylindrical body 2 to provide an action to form a magnified image of a part of the pattern attached to the side face as described above. This can provide the clear detection of a pattern change depending on a slight change of the visual line angle (i.e., a change in white and black as described above). This means that the detection of a change of the pattern can provide the detection of a slight change of the visual line angle, thus providing the unique estimate of the attitude in a wider range of angles. The following section will describe this estimate method with reference to FIG. 8.

Figure 8:
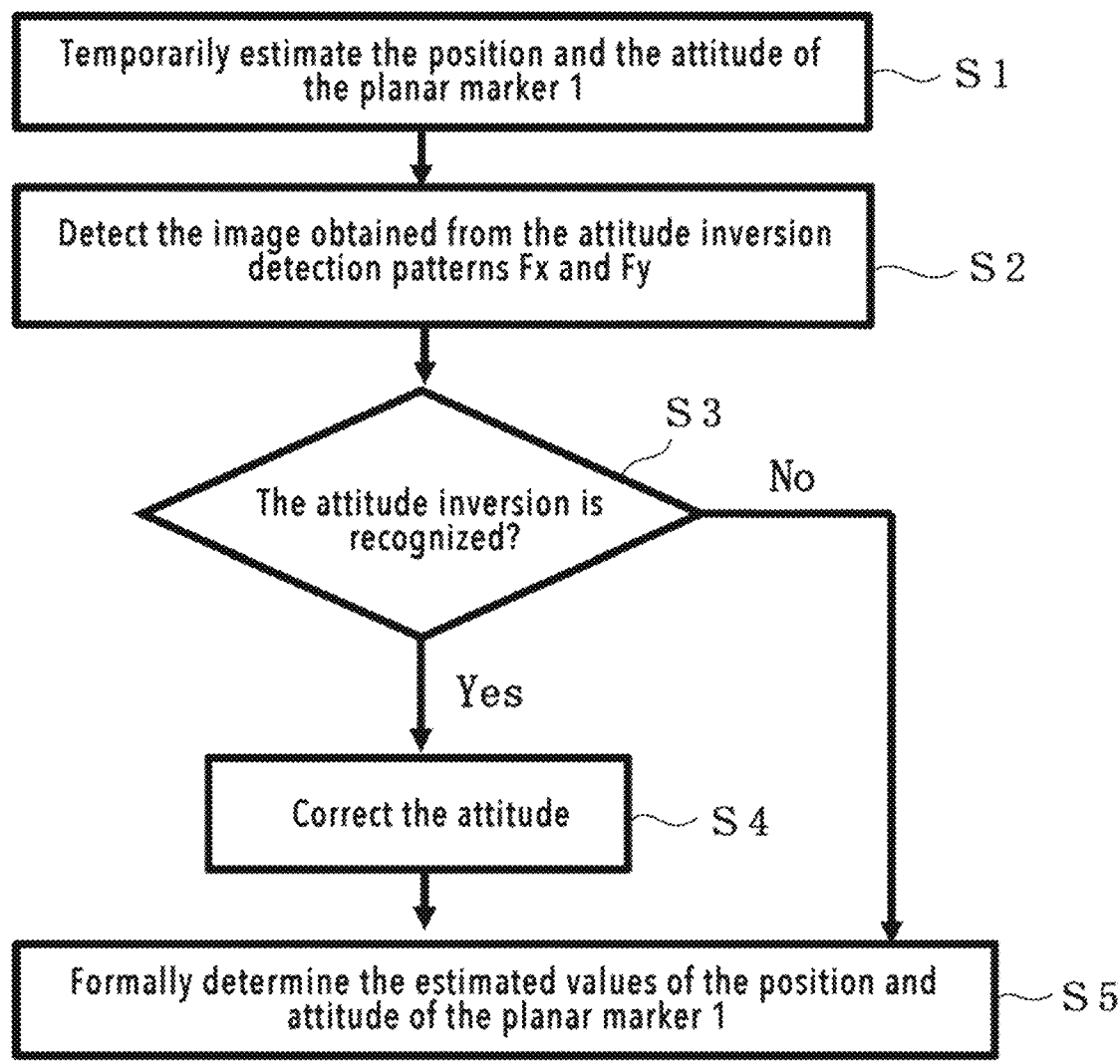
FIG. 8 is a flowchart illustrating a method of using the planar marker 1 using the planar marker 1 shown in FIG. 2 to estimate the position and attitude of a target attached with the planar marker 1.

FIG. 8 is a flowchart illustrating the method of estimating the position and the attitude of the target attached with the planar marker 1 using the planar marker 1 shown in FIG. 2.

As shown in FIG. 8, in Step S, the position and the attitude of the target attached with the planar marker 1 is temporarily estimated by the known method of analyzing an image obtained by imaging the planar marker 1.

Next, in Step S2, the image obtained by the attitude inversion detection patterns Fx and Fy is detected. Next, in Step S3, an image obtained when no attitude inversion is performed is compared with the image actually detected in Step S2 to thereby determine whether or not the attitude inversion is recognized. Then, when the image detected in Step S2 matches the image obtained when no attitude inversion is performed, it is determined that no attitude inversion is recognized to proceed to Step S5. When the image detected in Step S2 does not match the image obtained when no attitude inversion is performed on the other hand, it is determined that the attitude inversion is recognized to proceed to Step S4.

In Step S4, the attitude temporarily estimated in Step S1 is corrected by being converted based on an inversion model. This correction is realized by the method disclosed in International Publication WO2015/045834.

Next, in Step S5, the estimated values of the position and attitude of the target attached with the planar marker 1 are formally determined.

The following section will describe another illustrative example as another example of the attitude inversion detection pattern F1 shown in FIG. 3. The attitude inversion detection pattern F1 shown in FIG. 3 has the side face having the white section wt and the black section bk. However, when a monotone image is used, any combination other than the combination of white and black may be used so long as light and darkness can be differentiated. When a color image is used on the other hand, any colors other than achromatic color may be used.

Regarding the method of coloring the side face of the attitude inversion detection pattern F1 shown in FIG. 3, any method may be used such as a method of directly painting or printing the transparent cylindrical body 2 or attaching a printed matter to the transparent cylindrical body 2.

Figure 9:
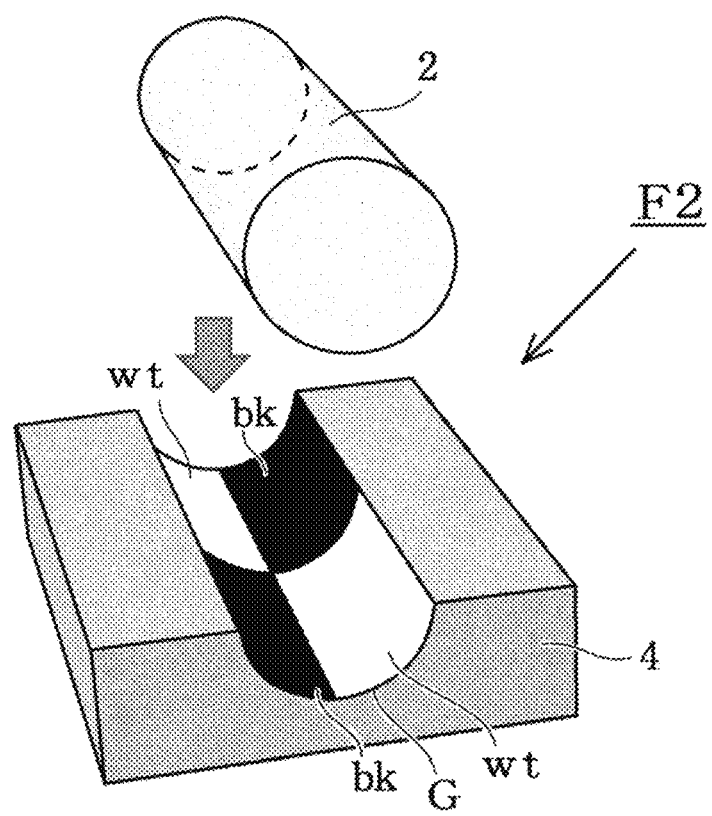
FIG. 9 illustrates the configuration of the attitude inversion detection pattern F2 according to the second illustrative example of the attitude inversion detection patterns Fx and Fy shown in FIG. 2.

In the second illustrative example of the attitude inversion detection patterns Fx and Fy shown in FIG. 2, the attitude inversion detection pattern F2 may be used as shown in FIG. 9 that is obtained by allowing the base 4 having the groove G having a semicircular cross section and a surface attached with a pattern to be engaged with the transparent cylindrical body 2 as shown by the arrow. The attitude inversion detection pattern F2 is configured so that the surface of groove G is colored instead of the side face of the transparent cylindrical body 2. FIG. 9 illustrates a specific example where the surface of groove G is colored with the two colors of white and black.

Figure 10:
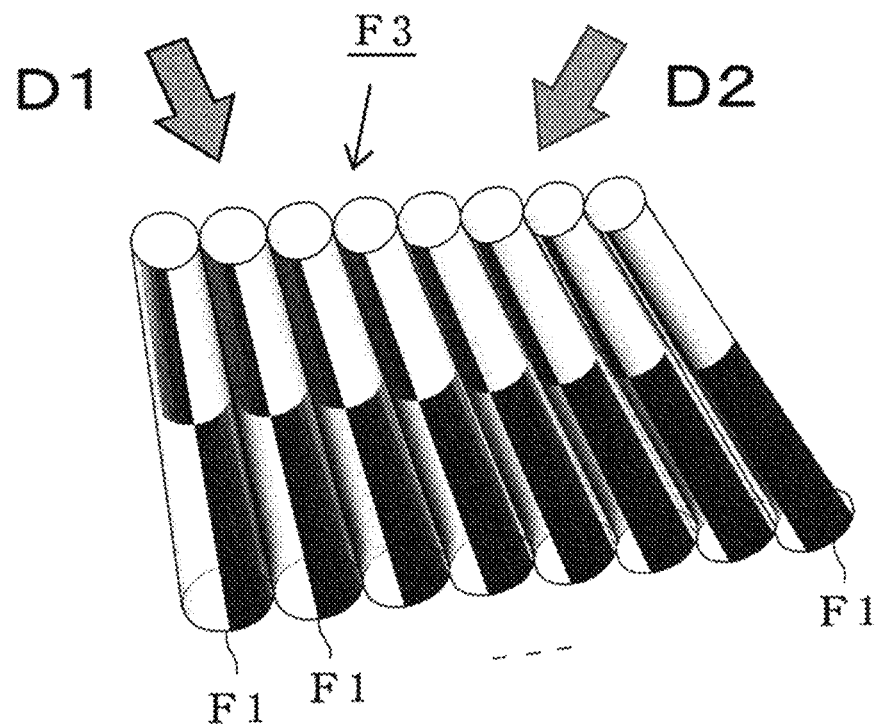
FIG. 10 illustrates the configuration of the attitude inversion detection pattern F3 according to the third illustrative example of the attitude inversion detection patterns Fx and Fy shown in FIG. 2.

In the third illustrative example of the attitude inversion detection patterns Fx and Fy shown in FIG. 2, the attitude inversion detection pattern F3 as shown in FIG. 10 may be used in which a plurality of transparent cylindrical bodies 2 are arranged in a parallel manner so that the central axes ra are parallel and the side faces are adjacent to one another. In the attitude inversion detection pattern F3, the individual attitude inversion detection patterns F1 arranged to be parallel to one another have the same pattern and the transparent-side side faces aligned with one another.

As described above, the plurality of parallelly-arranged attitude inversion detection patterns F1 can provide the increase of the two-dimensional surface area when the attitude inversion detection patterns are seen from a direction for which the visual line angle is zero. Thus, the attitude inversion detection patterns can have a reduced thickness relative to this surface area, thus realizing the planarity.

The attitude inversion detection pattern F3 has the entire appearance as shown in FIG. 11A when being seen from the direction D1 shown in FIG. 10 for which the visual line angle has a positive value in which the upper side has the white section wt and the lower side has the black section bk. On the other hand, the attitude inversion detection pattern F3 has the entire appearance as shown in FIG. 11B when being seen from the direction D2 shown in FIG. 10 for which the visual line angle has a negative value in which the upper side has the black section bk and the lower side has the white section wt. This shows that the attitude inversion detection pattern F3 provides a function similar to that provided by the individual attitude inversion detection pattern F1.

Figure 12B:
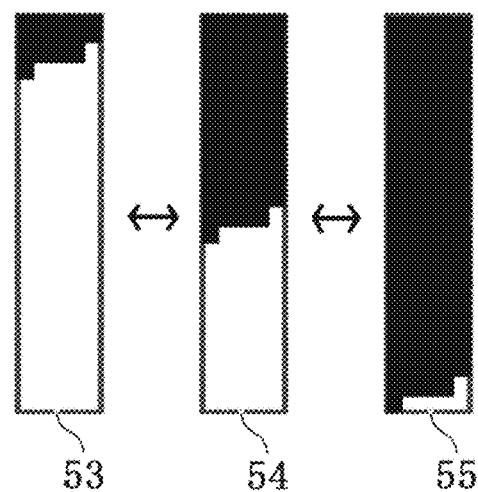
FIG. 12B illustrates the appearance when the attitude inversion detection pattern F4 is seen from the directions D3-D5 shown in FIG. 12A.

In the fourth illustrative example of the attitude inversion detection patterns Fx and Fy shown in FIG. 2, the attitude inversion detection pattern F4 as shown in FIG. 12A may be used in which the pattern 5 is attached to the half side face of the back side of the drawing of the transparent cylindrical body 2 as shown by the arrow. The pattern 5 has the upper side and the lower side divided to two colors of black and white between a rectangular diagonal line as a boundary line so that the former and the latter have different proportions in the central axis direction depending on the direction around the central axis for example. The attitude inversion detection pattern F4 having the configuration as described above shows the appearances 53-55 shown in FIG. 12B depending on the visual line angle.

Specifically, when the attitude inversion detection pattern F4 is seen from the direction D3 shown in FIG. 12A, the appearance 53 as shown in FIG. 12B is obtained in which the black section can be barely seen at the upper side. However, when the attitude inversion detection pattern F4 is seen from the direction D5 shown in FIG. 12A, the appearance 55 as shown in FIG. 12B is obtained in which the majority is occupied by the black section. When the attitude inversion detection pattern F4 is seen from the direction D4 at the middle between the direction D3 and the direction D5 as shown in FIG. 12A, the appearance 54 as shown in FIG. 12B is obtained in which the amount of the visually-recognized black section is about a half amount when compared with those of the appearance 53 and the appearance 55.

According to the attitude inversion detection pattern F4 having the action as described above, an image generated by the attitude inversion detection pattern F4 can be detected to thereby detect the visual line angle around the rotation axis the transparent cylindrical body 2, thus providing a goniometer application.

Figure 13A:
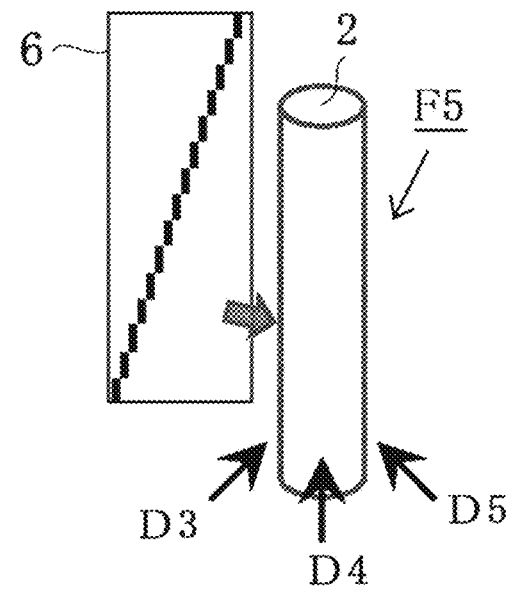
FIG. 13A illustrates the appearance of the attitude inversion detection pattern F5 according to the fifth illustrative example of the attitude inversion detection patterns Fx and Fy shown in FIG. 2.

In the fifth illustrative example of the attitude inversion detection patterns Fx and Fy shown in FIG. 2, the attitude inversion detection pattern F5 as shown in FIG. 13A may be used in which the pattern 6 colored depending on a different position in the central axis direction (e.g., along the rectangular diagonal line) depending on the direction around the central axis is attached, as shown by the arrow, to the half side face at the back side of the transparent cylindrical body 2 in the drawing. The attitude inversion detection pattern F5 having the configuration as described above has the appearances 63-65 shown in FIG. 13B depending on the visual line angle.

Figure 13B:
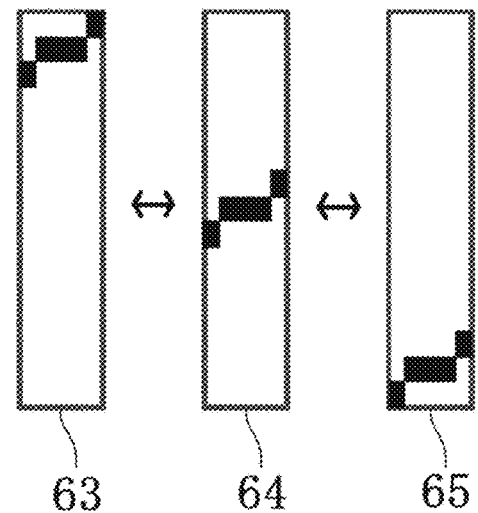
FIG. 13B illustrates the appearance when the attitude inversion detection pattern F5 is seen from the directions D3-D5 shown in FIG. 13A.

Specifically, when the attitude inversion detection pattern F5 is seen from the direction D3 shown in FIG. 13A, the colored section is seen at the upper side position as shown in the appearance 63 of FIG. 13B. When the attitude inversion detection pattern F5 is seen from the direction D5 shown in FIG. 13A, the colored section is seen at the lower side position as shown in the appearance 65 of FIG. 13B. When the attitude inversion detection pattern F5 is seen from the direction D4 at the middle between the direction D3 and the direction D5 as shown in FIG. 13A, the position of the visually-recognized colored section is positioned at the middle between the appearance 63 and the appearance 65 as shown in the appearance 64 as shown in FIG. 13B.

The attitude inversion detection pattern F5 having the action as described above also can detect an image generated by the attitude inversion detection pattern F5 to thereby detect the visual line angle around the rotation axis of the transparent cylindrical body 2, thus providing a goniometer application.

Figure 14A:
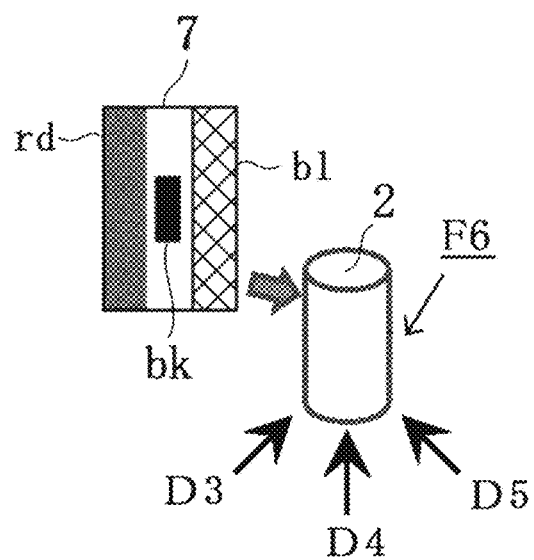
FIG. 14A illustrates the configuration of attitude inversion detection pattern F6 according to the sixth illustrative example of the attitude inversion detection patterns Fx and Fy shown in FIG. 2.

In the sixth illustrative example of the attitude inversion detection patterns Fx and Fy shown in FIG. 2, the attitude inversion detection pattern F6 as shown in FIG. 14A may be used in which the pattern 7 that has, depending on the direction around the central axis of the transparent cylindrical body 2, a different pattern or color (e.g., a red section rd, a black section bk partially colored in the central axis direction, and a blue section bl) is attached, as shown by the arrow, to the half side face at the back side of the transparent cylindrical body 2 in the drawing. The attitude inversion detection pattern F6 having the configuration as described above has the appearances 73-75 shown in FIG. 14B depending on the visual line angle.

Figure 14B:
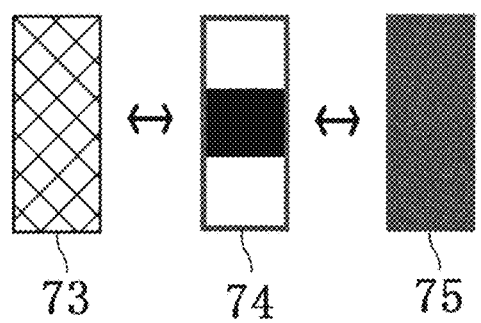
FIG. 14B illustrates the appearance when the attitude inversion detection pattern F6 is seen from the directions D3-D5 shown in FIG. 14A.

Specifically, when the attitude inversion detection pattern F6 is seen from the direction D3 shown in FIG. 14A, the image of a blue section bl is seen as shown in the appearance 73 of FIG. 14B. When the attitude inversion detection pattern F6 is seen from the direction D5 shown in FIG. 14A, the image of a red section rd is seen as shown in the appearance 75 of FIG. 14B. When the attitude inversion detection pattern F6 is seen from the direction D4 at the middle between the direction D3 and the direction D5 as shown in FIG. 14A, the image of a black section bk partially colored in the central axis direction is seen as shown in the appearance 74 shown in FIG. 14B.

According to the attitude inversion detection pattern F6 having the action as described above, the pattern or color of an image generated by the attitude inversion detection pattern F6 changes depending on the visual line angle. Thus, the pattern or color can show the rotation status around the rotation axis of the target attached with the attitude inversion detection pattern F6 such as a switch for example.

Figure 15A:
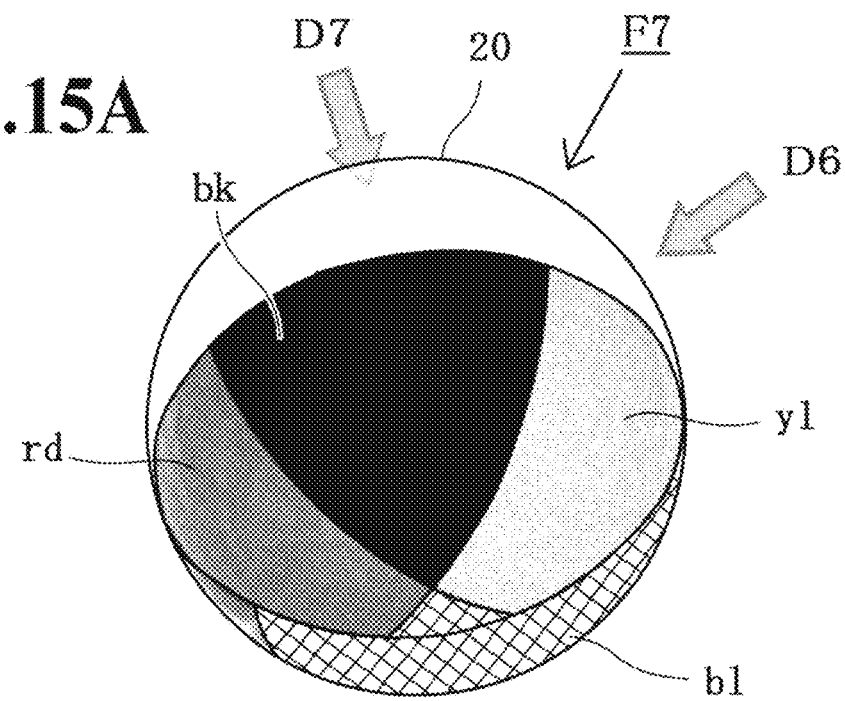
FIG. 15A illustrates the configuration of the attitude inversion detection pattern F7 according to the seventh illustrative example of the attitude inversion detection patterns Fx and Fy shown in FIG. 2.

In the seventh illustrative example of the attitude inversion detection patterns Fx and Fy shown in FIG. 2, at least one attitude inversion detection pattern F7 may be provided on the same plane as that of the planar visual marker MA. As shown in FIG. 15A. the attitude inversion detection pattern F7 consists of the transparent spherical body 20 having the hemispherical surface attached with a pattern (e.g., the red section rd, the black section bk, a yellow section yl, and the blue section bl).

According to the attitude inversion detection pattern F7 as described above, an image obtained by partially magnifying the pattern through the transparent spherical body 20 depending on the two-dimensional visual line angle is detected through the transparent-side hemispherical surface having no pattern. Then, a red image by the reflected light from the red section rd is detected in the direction D6 shown in FIG. 15A and a blue image by the reflected light from the blue section bl is detected in the direction D7 for example.

Thus, the attitude inversion detection pattern F7 having the action as described above can individually detect the attitude inversion in a similar manner in the case where two one-dimensional attitude inversion detection patterns for each detecting a visual line angle around one axis are arranged in different directions.

The attitude inversion detection pattern F7 shown in FIG. 15A can provide a similar function as that of the attitude inversion detection pattern F3 shown in FIG. 10. The reason is that a plurality of patterns are provided to be adjacent one another in two independent directions (e.g., longitudinal and lateral directions) having the same plane as that of the planar visual marker MA to thereby increase the two-dimensional surface area when the attitude inversion detection pattern F7 is seen from the origin direction of the visual line angle, thus allowing the attitude inversion detection pattern F7 having a thickness in a smaller proportion to this surface area, thus realizing the planarity.

Figure 15B:
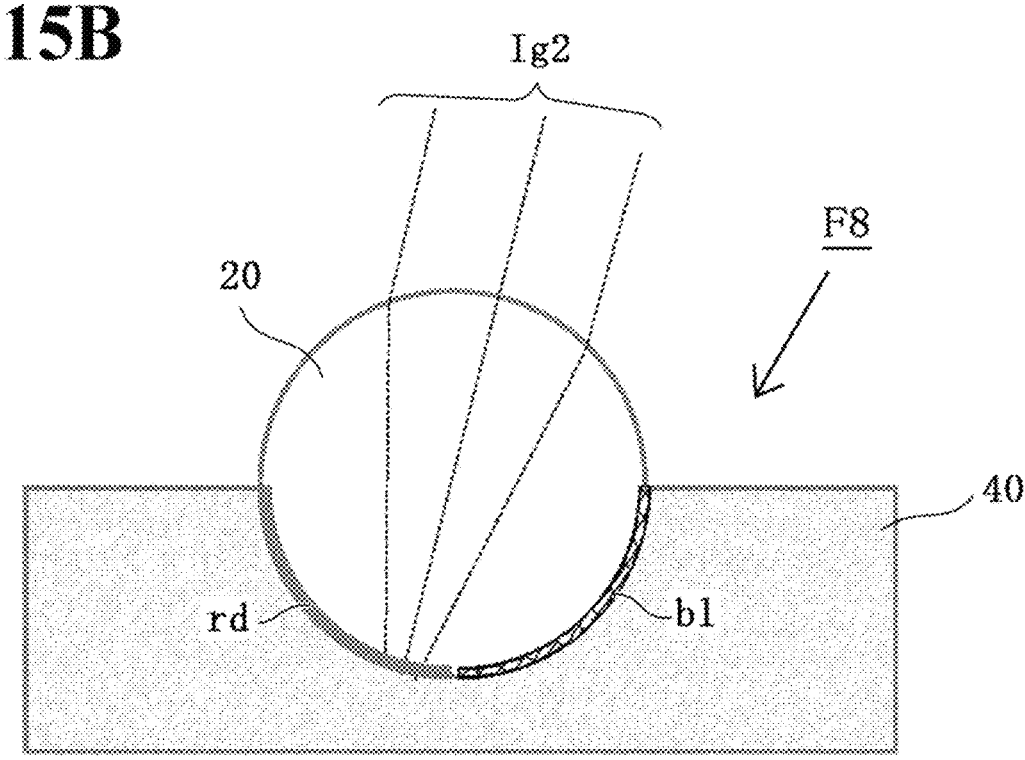
FIG. 15B illustrates the configuration of the attitude inversion detection pattern F8 according to the eighth illustrative example of the attitude inversion detection patterns Fx and Fy shown in FIG. 2.
Figure 16A:
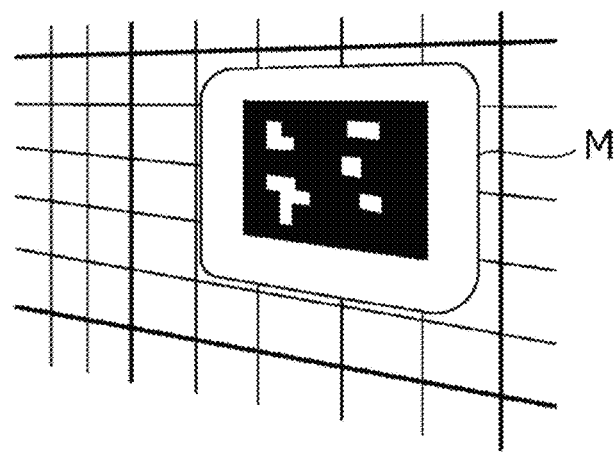
FIG. 16A illustrate the issue of the uncertain attitude of the planar marker M by illustrating a case where the projection on an imaged image is a perspective projection.
Figure 16B:
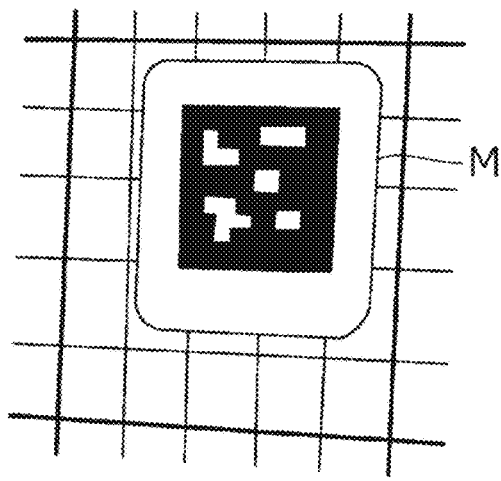
FIG. 16B illustrate the issue of the uncertain attitude of the planar marker M by illustrating a case where the projection on an imaged image is similar to an orthographic projection.
Figure 17:
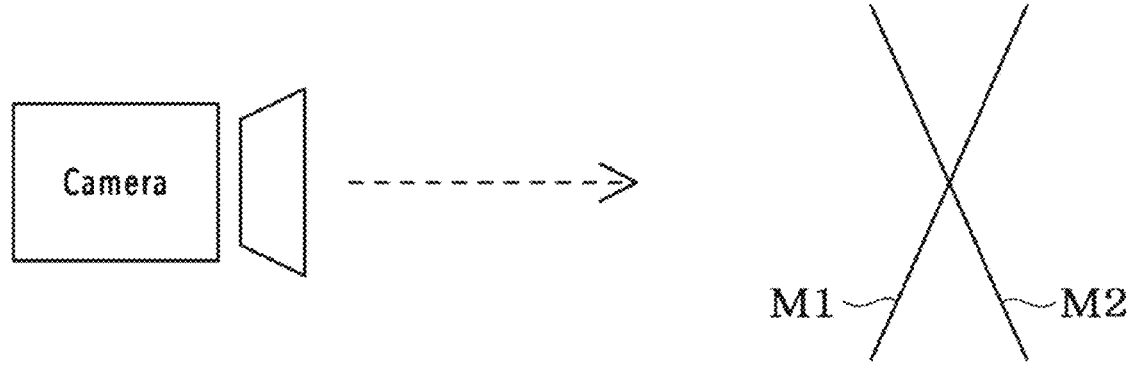
FIG. 17 is the third diagram in order to explain the uncertain attitude of the planar marker M shown in FIG. 16.

In the eighth illustrative example of the attitude inversion detection patterns Fx and Fy shown in FIG. 2, the attitude inversion detection pattern F8 may be provided on the same plane as that of the planar visual marker MA. The attitude inversion detection pattern F8 has a configuration as shown in FIG. 15B that has the base 40 having a hemispherical concave section attached with a pattern having the red section rd and the blue section bl on the surface for example and the transparent spherical body 20 engaged with the concave section.

According to the attitude inversion detection pattern F8 as described above, the pattern attached to the surface of the concave section is partially magnified by the lens effect of the transparent spherical body 20. Specifically, it can be seen as shown in FIG. 15B that the red image Ig2 is generated by the light reflected from a part of the red section rd attached to the concave section, thus providing a function similar to that of the attitude inversion detection pattern F7 for example.

As described above, according to the marker according to an embodiment of the present invention, the attitude inversion detection patterns F1-F8 provide a function to uniquely estimate the attitude in a wider range of angles, thus realizing a more accurate attitude estimate.

REFERENCE SIGNS LIST

1 Planar marker
2 Transparent cylindrical body
3, 5-7 Colored pattern
4,40 Base
20 Transparent spherical body
MA Planar visual marker
Fx, Fy, F1-F8 Attitude inversion detection pattern
ra Central axis
bk Black section
wt White section
rd Red section
bl Blue section
yl Yellow section
G Groove

The invention claimed is:

1. A marker comprising: a two-dimensional pattern code; and at least two attitude inversion detection patterns each of which consisting of a transparent cylindrical body having a pattern on a side face in a range of 180 degrees around a central axis of the cylindrical body, the attitude inversion detection patterns being provided so as to be orthogonal to each other, wherein the two-dimensional pattern code and the attitude inversion detection patterns are provided on a same plane.

2. The marker according to claim 1, wherein the two-dimensional pattern code has a rectangular shape, a first one of the attitude inversion detection patterns is provided to be parallel to a first side constituting the rectangular shape, and a second one of the attitude inversion detection patterns is provided to be parallel to a second side that constitutes the rectangular shape, wherein the second side is adjacent to the first side.

3. The marker according to claim 1, wherein the pattern includes:
   a first colored section having at least two color sections in the central axis direction within a range of 90 degrees around the central axis of the side face; and a second colored section having at least two color sections in the central axis direction within the range of 90 degrees around the central axis of the side face adjacent to the first colored section so that the second colored section is different from the first colored section.

4. The marker according to claim 3, wherein
the first colored section and the second colored section are each divided to two white and black sections.

5. The marker according to claim 1, wherein
the pattern is divided to two color sections so that the two color sections have different proportions in the central axis direction depending on the direction around the central axis.

6. The marker according to claim 1, wherein
the pattern is colored at a different position in the central axis direction depending on the direction around the central axis.

7. The marker according to claim 1, wherein
the pattern has a different pattern or color depending on the direction around the central axis.

8. The marker according to claim 1, wherein
the attitude inversion detection pattern has a plurality of the transparent cylindrical bodies so that the transparent cylindrical bodies have parallel central axes and the side faces are adjacent to one another.

* * * * *